United States Patent
Lee et al.

(10) Patent No.: US 12,070,053 B2
(45) Date of Patent: Aug. 27, 2024

(54) KIMCHI STUFFING ADDING DEVICE, SPRAYING MECHANISM FOR KIMCHI STUFFING ADDING DEVICE, AND DUMPING LIFTER FOR KIMCHI STUFFING ADDING DEVICE

(71) Applicant: CJ CHEILJEDANG CORPORATION, Seoul (KR)

(72) Inventors: Dong Yun Lee, Hwaseong-si (KR); In Jae Kim, Anseong-si (KR); Kyung Taek Park, Icheon-si (KR); Il Gyu Song, Incheon (KR); Ji Young Oh, Yongin-si (KR); Ga Yeong Lee, Suwon-si (KR); Hee Jeong Lim, Suwon-si (KR); Chan Su Jung, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 753 days.

(21) Appl. No.: 17/280,022

(22) PCT Filed: Jun. 13, 2019

(86) PCT No.: PCT/KR2019/007140
§ 371 (c)(1),
(2) Date: Mar. 25, 2021

(87) PCT Pub. No.: WO2020/067626
PCT Pub. Date: Apr. 2, 2020

(65) Prior Publication Data
US 2022/0030926 A1 Feb. 3, 2022

(30) Foreign Application Priority Data
Sep. 28, 2018 (KR) .................. 10-2018-0116367

(51) Int. Cl.
*A23P 20/18* (2016.01)
*A23B 7/10* (2006.01)
(Continued)

(52) U.S. Cl.
CPC .............. *A23P 20/18* (2016.08); *A23B 7/105* (2013.01); *A23L 19/20* (2016.08); *A23N 15/00* (2013.01); *A23V 2002/00* (2013.01)

(58) Field of Classification Search
CPC .......... A23P 20/12; A23P 20/13; A23P 20/15; A23P 20/18; A23B 7/105
(Continued)

(56) References Cited

U.S. PATENT DOCUMENTS

2015/0274336 A1   10/2015   Kaneko
2016/0374354 A1   12/2016   Elayedath et al.

FOREIGN PATENT DOCUMENTS

CN   102823912 A   12/2012
CN   203913273 U   11/2014
(Continued)

OTHER PUBLICATIONS

English translation of KR101163096 (Year: 2012).*
(Continued)

*Primary Examiner* — Chris Q Liu
(74) *Attorney, Agent, or Firm* — Merchant & Gould P.C.

(57) ABSTRACT

A Kimchi stuffing adding device according to the present invention comprises: a Kimchi stuffing seasoning storage tank; a seasoning transport pump for receiving seasoning supplied from the Kimchi stuffing seasoning storage tank and supplying the seasoning to a transport pipe; a hopper for receiving the seasoning supplied from the transport pipe via a branch pipe that is branched from the transport pipe, and temporarily storing the seasoning; and a spray mechanism installed to be able to selectively spray the seasoning onto an
(Continued)

end portion of the hopper. The spray mechanism can be turned ON or OFF and is provided to periodically spray a certain amount of the seasoning when turned on.

17 Claims, 10 Drawing Sheets

(51) Int. Cl.
*A23L 19/20* (2016.01)
*A23N 15/00* (2006.01)

(58) Field of Classification Search
USPC .......................................................... 99/486
See application file for complete search history.

(56) References Cited

FOREIGN PATENT DOCUMENTS

| | | | |
|---|---|---|---|
| CN | 104943898 A | 9/2015 | |
| CN | 108208723 A | 6/2018 | |
| JP | H01165348 A | 6/1989 | |
| JP | 2011062580 A | 3/2011 | |
| JP | 5451279 B2 | 3/2014 | |
| JP | 2015182806 A | 10/2015 | |
| JP | 2017212901 A | 12/2017 | |
| KR | 20090102915 A | 10/2009 | |
| KR | 20090126758 A | 12/2009 | |
| KR | 10-1020830 B1 | 3/2011 | |
| KR | 101163096 B1 | 7/2012 | |
| KR | 20120128383 A | 11/2012 | |
| KR | 101495303 B1 | 2/2015 | |
| KR | 20150111847 A | 10/2015 | |
| WO | 03/079803 A2 | 10/2003 | |

OTHER PUBLICATIONS

English translation of KR 20090102915 (Year: 2009).*
Japanese Office Action for JP Application No. 2021-540998 mailed Mar. 15, 2022 (8 pages, with English translation).
Extended European Search Report for EP Application No. 19865497.2 mailed Jun. 9, 2022 (9 pages).
Office Action issued on Apr. 26, 2023 for the corresponding Chinese patent application 201980063049.2 (13 pages).
International Search Report of the International Searching Authority issued in corresponding International Patent Application No. PCT/KR2019/007140, mailed Oct. 1, 2019, 4 pages.
Office Action issued on Mar. 23, 2024 for the corresponding Chinese patent application 201980063049.2 (16 pages including English Translation).
Zhang Heping et al., "Modern Dairy Industry Handbook", 1st Edition, Aug. 31, 2005, China Light Industry Press, pp. 497-499 (together with the machine translation of the related part to this case).
Zhang Junhe et al., "Food Machinery and Equipment", 1st edition, Aug. 31, 2012, Science and Technology of China Publisher, pp. 207-209 (together with the machine translation of the related part to this case).
Chen Guanwen et al., "Separation Membrane Application and Engineering Cases", 1st edition, Nov. 30, 2007, National Defense Industry Publishing Society, pp. 456-457 (together with the machine translation of the related part to this case).

* cited by examiner

KIMCHI STUFFING ADDING DEVICE, SPRAYING MECHANISM FOR KIMCHI STUFFING ADDING DEVICE, AND DUMPING LIFTER FOR KIMCHI STUFFING ADDING DEVICE

This application is a National Stage Application of PCT/KR2019/007140, filed Jun. 13, 2019, which claims benefit of Serial No. 10-2018-0116367, filed Sep. 28, 2018 in Republic of Korea and which applications are incorporated herein by reference. To the extent appropriate, a claim of priority is made to each of the above disclosed applications.

TECHNICAL FIELD

The present disclosure relates to a Kimchi stuffing putting device, a spraying mechanism for the Kimchi stuffing putting device, and a dumping lifter for the Kimchi stuffing putting device. More particularly, the efficiency in a preparing process of putting Kimchi stuffing may be improved, because a worker merely places Kimchi at a specific position in which seasoning is sprayed, and then spreads cabbage leaves, as a specific amount of seasoning is periodically sprayed to the specific position by a spraying mechanism.

BACKGROUND ART

In general, the domestic Kimchi market has increasingly grown every year due to the expansion of dining out culture and the expansion of school meals resulting from nuclear family. The demand for Kimchi which are industrially produced, is continuously increased, and even consumer tastes are required in various forms.

The Kimchi industry has a higher percentage of labor costs among costs for preparing Kimchi. In particular, a process of putting stuffing seasoning in the preparing process for the Kimchi is difficult to be realized through automation. Accordingly, most part of the process of putting the stuffing seasoning is performed through a manual work, which makes it difficult to escape from a cottage industry. It is urgent to improve the process of putting Kimchi stuffing to automate the preparing process of Kimchi and to improve the productivity. If the process of putting the stuffing seasoning in the preparing process of the Kimchi is mechanized, the price competitiveness of Kimchi products may be ensured by reducing the costs for Kimchi. In addition, the quality of the Kimchi may be uniformed and production may be carried out more smoothly through the improvement of a Kimchi process.

However, the size of the Kimchi stuffing seasoning is not uniform and the size of cabbage filled with the Kimchi stuffing seasoning is not uniform, so there is a limitation to the overall mechanization of the process of putting Kimchi stuffing. Accordingly, it is necessary to develop an advanced Kimchi stuffing putting device to improve productivity while considering the characteristic of the process of putting Kimchi stuffing seasoning.

DISCLOSURE

Technical Problem

The present disclosure is to improve the productivity in a process of putting Kimchi stuffing by automatically filling Kimchi stuffing seasoning in a cabbage in a process of putting the Kimchi stuffing.

In addition, the present disclosure to provide a Kimchi stuffing putting device which can be conveniently operated by a worker.

In addition, the present disclosure is to provide a dumping lifter, capable of easily supplying seasoning into Kimchi stuffing seasoning storage tank to store Kimchi stuffing seasoning, from a movable tank to receive and transfer Kimchi.

The objects which will be achieved in the present disclosure are not limited to the above, but other objects, which are not mentioned, will be apparently understood to those skilled in the art.

Technical Solution

In order to accomplish the objects, according to an embodiment of the present disclosure, a Kimchi stuffing putting device may include a Kimchi stuffing seasoning storage tank, a seasoning transferring pump to receive seasoning from the Kimchi stuffing seasoning storage tank and to supply the seasoning to a transferring pipe, a hopper to receive the seasoning from the transferring pipe through a branching pipe branching from the transferring pipe and to temporarily store the seasoning, and a spraying mechanism mounted at an end portion of the hopper to selectively spray the seasoning.

The spraying mechanism is able to be turned on and off, and to periodically spray a specific amount of seasoning when the spraying mechanism is turned on.

In order to accomplish the objects, according to an embodiment of the present disclosure, a spraying mechanism for a Kimchi stuffing putting device is provided to periodically spray a preset specific amount of seasoning, to be turned on or turned off through a user operation, and to adjust a period of spraying the seasoning and an amount of sprayed seasoning.

In order to accomplish the objects, according to an embodiment of the present disclosure, a dumping lifter for a Kimchi stuffing putting device includes a docking member provided to be coupled to the movable tank, and a tower member coupled to the docking member and provided to move up or move down the docking member.

The tower member includes a base having a contact surface with a floor, a driver configured to provide driving force to move up the docking member, a vertical extension part extending upward from the base to receive a power transmitting member that transmits the driving force of the driver to the docking member, and a guide rail extending by a specific length in a top-bottom direction and extending in a first direction from an upper end extending in the top-bottom direction. The first direction is defined as a direction of employing, as a main directional component, a directional component horizontal to a ground surface and of facing an opposite side to one side, which couples the docking member to the movable tank, of the vertical extension part.

The docking member includes a docking part coupled to the movable tank, a driving arm coupled to the power transmitting member, and a guide arm provided to be movable along the guide rail, and positioned above the driving arm. The guide arm moves along the guide rail in the first direction after the docking member is moved up to a specific height, and the docking member and the movable tank are rotated, as the driving arm is continuously moved up.

Advantageous Effects

Embodiments of the disclosure have one or more following effects.

First, the efficiency in the process of putting Kimchi stuffing may be improved, because a worker merely places Kimchi at a specific position in which seasoning is sprayed, and then spreads cabbage leaves, as a specific amount of seasoning is periodically sprayed to the specific position by a spraying mechanism.

Second, the spraying mechanism for the Kimchi stuffing adding device is turned on or off through a user operation, and a period of spraying seasoning and a sprayed amount per the period of spraying are adjustable. Accordingly, the user may simply operate the spraying mechanism if necessary and may efficiently perform the process of putting the Kimchi stuffing. In addition, since the setting of the spraying mechanism may be changed depending on an environment of preparing Kimchi, ingredients may be prevented from being unnecessarily wasted and Kimchi having a uniform quality may be produced.

Third, the seasoning may be supplied into the Kimchi stuffing seasoning storage tank, as the movable tank is moved up and down and rotated by using the dumping lifter. Accordingly, manpower may be reduced, and the process may be efficiently performed.

The effects of the present disclosure are not limited to the above, but other effects, which are not mentioned, will be apparently understood to those skilled in the art.

MODE FOR INVENTION

Figure 1:
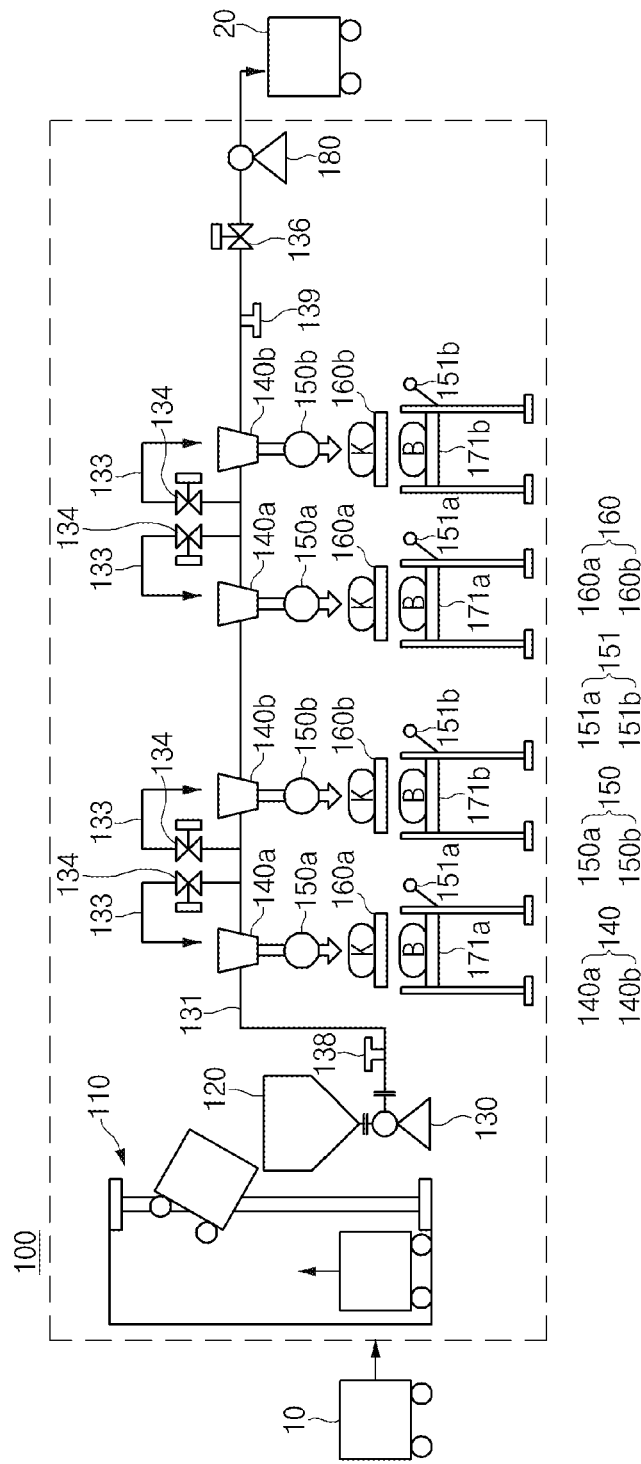
FIG. 1 is a schematic view illustrating a Kimchi stuffing adding device, according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

Hereinafter, "Top", "Bottom", "Left", "Right", "Front", or "Rear" is defined as indicated in accompanying drawings. However, the definition is provided for the illustrative purpose, and "Top", "Bottom", "Left", "Right", "Front", or "Rear" may be differently defined.

Overall Configuration of Kimchi Stuffing Adding Device

FIG. 1 is a schematic view illustrating a Kimchi stuffing adding device, according to an embodiment of the present disclosure.

According to the present embodiment, a Kimchi stuffing adding device 100 includes a Kimchi stuffing seasoning storage tank 105, a seasoning transferring pump 130, a hopper 140, and a spraying mechanism 150.

The Kimchi stuffing seasoning storage tank 105 stores Kimchi stuffing seasoning.

The seasoning transferring pump 130 receives seasoning from the Kimchi stuffing seasoning storage tank and supplies the seasoning to a transferring pipe 131.

The hopper 140 receives the seasoning from the transferring pipe 131 through a branching pipe 133 branching from the transferring pipe 131, and temporarily stores the seasoning therein.

The spraying mechanism 150 is mounted at an end portion of the hopper 140 to selectively spray the seasoning. The spraying mechanism 150 may be provided to be turned on and off, and to spray a specific amount of seasoning when the spraying mechanism 150 is turned off.

Conventionally, it is difficult to improve the productivity to some extent or more in a process of preparing Kimchi because Kimchi is mainly manually prepared. Especially, a process of putting Kimchi stuffing seasoning is performed by repeating work in which a worker spreads each of cabbage leaves and putting the Kimchi stuffing seasoning. However, there is absent an automatic device to improve the efficiency of the work.

According to the present embodiment, the Kimchi stuffing putting device includes the spraying mechanism to periodically spray a specific amount of Kimchi stuffing seasoning. In more detail, according to the present embodiment, the Kimchi stuffing putting device has a basic feature of including the spraying mechanism, such that the worker only spreads the cabbage leaves and the automatic device sprays the Kimchi stuffing seasoning between the cabbage leaves.

Hereinafter, the Kimchi stuffing putting device will be described according to the present embodiment.

The Kimchi stuffing putting device 100 may further include a dumping lifter 110 which is a device to supply seasoning into the Kimchi stuffing seasoning storage tank 105 by moving up and dumping the movable tank 10 having the Kimchi stuffing seasoning.

The movable tank 10 may be provided to have a plurality of wheels on the bottom thereof to easily move. The movable tank 10 may include a seasoning storage provided in the shape of a box and may have an upper portion which is open.

The dumping lifter 110 may be provided to lift the movable tank 10 to a specific height and rotate the movable tank 10 at a specific angle or more such that seasoning is dumped from the movable tank 10 to the Kimchi stuffing seasoning storage tank 105.

The Kimchi stuffing seasoning storage tank 105 may include a seasoning inlet having an upper portion that is open. The Kimchi stuffing seasoning storage tank 105 may be provided in the shape narrowed toward a lower portion thereof such that the seasoning is introduced into the seasoning transferring pump 130.

The Kimchi stuffing seasoning storage tank 105 may further include a seasoning tank sensor (not illustrated) to sense an amount of seasoning received in the Kimchi stuffing seasoning storage tank 105. The dumping lifter 110 may be set to lift and dump the movable tank 10 to automatically supply additional seasoning into the Kimchi stuffing seasoning storage tank 103, when an amount of seasoning received in the Kimchi stuffing seasoning storage tank is less than a specific amount.

The seasoning transferring pump 130 may receive the seasoning from the Kimchi stuffing seasoning storage tank 105 and may supply the seasoning through the transferring pipe 131. The seasoning may be supplied to the seasoning transferring pump 130 from the Kimchi stuffing seasoning storage tank by the weight of the seasoning received in the Kimchi stuffing seasoning storage tank 105. To this end, the seasoning transferring pump 130 may be mounted under the Kimchi stuffing seasoning storage tank 105.

The seasoning transferring pump 130 may be used as one of various types of pumps. For example, the seasoning transferring pump 130 may be configured by using a Masosine pump. The Masosine pump is a positive displacement pump, in which a sinusoidal rotor is provided, a plurality of chambers are provided in the pump by the rotor and a pump body, push materials while being individually sealed. The Masosine pump hardly has any pulsation and is able to effectively pump a fluid containing lumps. Accordingly, The Masosine pump is suitable for transferring seasonings containing lumps unevenly as in the present disclosure.

The transferring pipe 131 may form a supply passage such that the seasoning discharged from the seasoning transferring pump 130 is supplied to the hopper 140. The branching pipe 133 may include a plurality of branching pipes 133 branching from a plurality of points of the transferring pipe 131.

The Kimchi stuffing putting device 100 may further include branching pipe valves 134 to open or close the branching pipes 133. The branching pipe valves 134 may adjust an amount of seasoning which is introduced from the transferring pipe 131 to the hopper 140.

The hopper 140 may receive the seasoning from the transferring pipe 131 through the branching pipe 133 and may temporarily store the seasoning. The hopper 140 may have an upper portion that is open, such that the seasoning is introduced from the branching pipe 133. The hopper 140 has an inlet port, which is formed at the open upper portion thereof, and the inlet port is provided to be wider than a lower end portion of the hopper 140, such that the seasoning is advantageously supplied from the branching pipe 133 to the hopper 140.

The Kimchi stuffing seasoning storage tank 100 may further include a hopper sensor (not illustrated) to sense an amount of seasoning received in the hopper 140. For example, the hopper sensor may be configured to include a laser sensor.

The seasoning transferring pump 130 may be set such that the seasoning transferring pump 130 is driven in the state that the branching pipe valve 134 is open and the seasoning is supplied to the hopper 140, when the amount of seasoning received in the hopper 140 is less than a specific amount.

The spraying mechanism 150 may be mounted at the end portion of the hopper 140, and may be provided to selectively spray the seasoning received from the hopper 140.

The Kimchi stuffing putting device 100 may further include a Kimchi stuffing putting working table 150 to place a cabbage "B" thereon. The Kimchi stuffing putting working table 160 may be disposed at a position at which the seasoning is sprayed from the spraying mechanism 150. In other words, the spraying mechanism 150 may be provided to spray the seasoning toward the Kimchi stuffing putting working table 160.

The Kimchi stuffing device 100 may further include cabbage introducing conveyors 171a and 171b that are provided in a caterpillar shape to continuously transfer cabbages. The expression is provided only for the illustrative purpose. For example, the Kimchi stuffing putting device 100 may include a single cabbage introducing conveyor or at least three cabbage introducing conveyors, but the present disclosure is not limited thereto. As the Kimchi stuffing putting working table 160 is mounted on the cabbage introducing conveyors 171a and 171b, a user "P" may perform a work of putting Kimchi stuffing by placing the cabbage "B" on the Kimchi stuffing putting working table 160.

The spraying mechanism 150 may include a spraying mechanism switch 151 to turn on or turn off the spraying mechanism 150. The spraying mechanism switch 151 may be provided at a position allowing the user "P" to operate the spraying mechanism switch without deviating from a working position in front of the Kimchi stuffing putting working table 160.

To this end, since the user "P" may conveniently turn on or turn off the spraying mechanism 150 at the working position "P" such that a working efficiency may be improved. For example, the user "P" may intend to turn off the spraying mechanism 150 to adjust a period of spraying the seasoning or an amount of the seasoning which is sprayed by the spraying mechanism 150. In this case, the user "P" may simply turn off the spraying mechanism 150 at the working position by using the spraying mechanism switch 151, may adjust the spraying mechanism 150, and may turn on the spraying mechanism 150 to resume a work.

The spraying mechanism 150 may be provided to change at least one of an amount of sprayed seasoning or a period of spraying seasoning.

The Kimchi stuffing putting device 100 may further include a seasoning recovering pump 180 to recover the seasoning, which has been supplied through the transferring pipe 131, into a Kimchi stuffing seasoning recovering tank 20. The seasoning recovering pump 180 may be connected with an end portion opposite to one end portion, which is connected with the seasoning transferring pump 130, of the transferring pipe 130.

For example, the seasoning recovering pump 180 may be configured in the form of a positive displacement pump. The seasoning recovering pump 180 may be configured in the form of a hose-type pump, and a vacuum portion may be generated when the seasoning recovering pump 180 is driven, such that the seasoning may be effectively recovered.

The Kimchi stuffing putting device 100 may further include a recovering valve 136 to allow the seasoning to be introduced into the seasoning recovering pump 180 or to block the seasoning from being introduced into the seasoning recovering pump 180. The recovering valve 136 may be configured to be closed while a branching pipe valve 134 is being open.

In addition, a seasoning recovering pump 180 may be configured to be driven in the state that the branching pipe valve 134 is closed and the recovering valve 136 is open, such that the seasoning is recovered into the Kimchi stuffing seasoning recovering tank 20. Accordingly, pumping pressure by the seasoning recovering pump 180 is prevented from being released into the branching pipe 133, and effectively applied to the transferring pipe 131, such that the seasoning is effectively recovered into the Kimchi stuffing seasoning recovering tank 20.

A pig ball introducing port 138 may be provided in one end portion, which is connected with the seasoning transferring pump 130, of the transferring pipe 131 and a pig ball discharging port 139 may be provided in an end portion, which is opposite to the one end portion, of the transferring pipe 131, such that seasoning remaining inside the transferring pipe 131 is recovered using a pig ball.

The pig ball is inserted into a pipe and moves along the pipe by pressure of air to discharge the fluid remaining in the pipe or to clean the pipe. To this end, a pig ball having a size that is in close contact with the inside of the pipe may be used.

Figure 2:
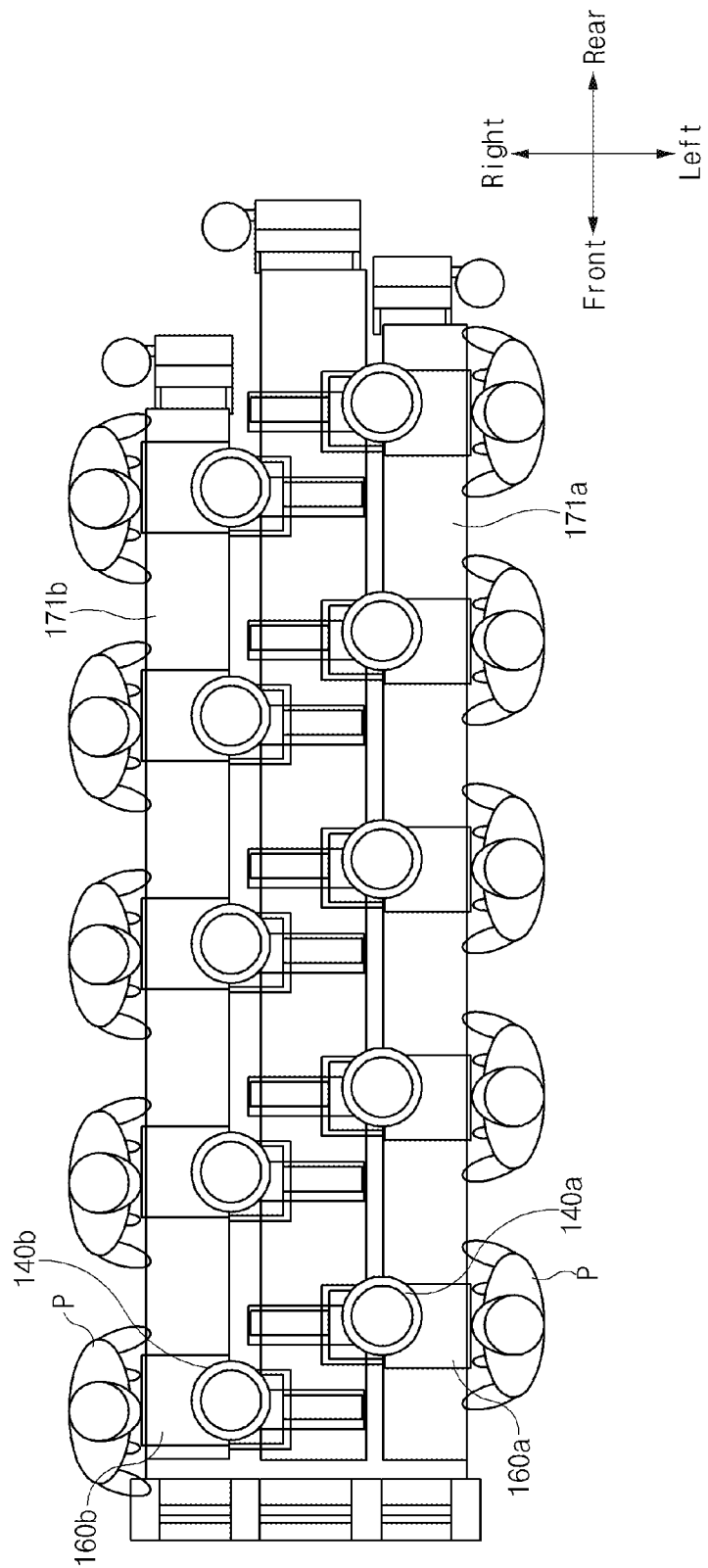
FIG. 2 is a plan view of the Kimchi stuffing putting device of FIG. 1.
Figure 3A:
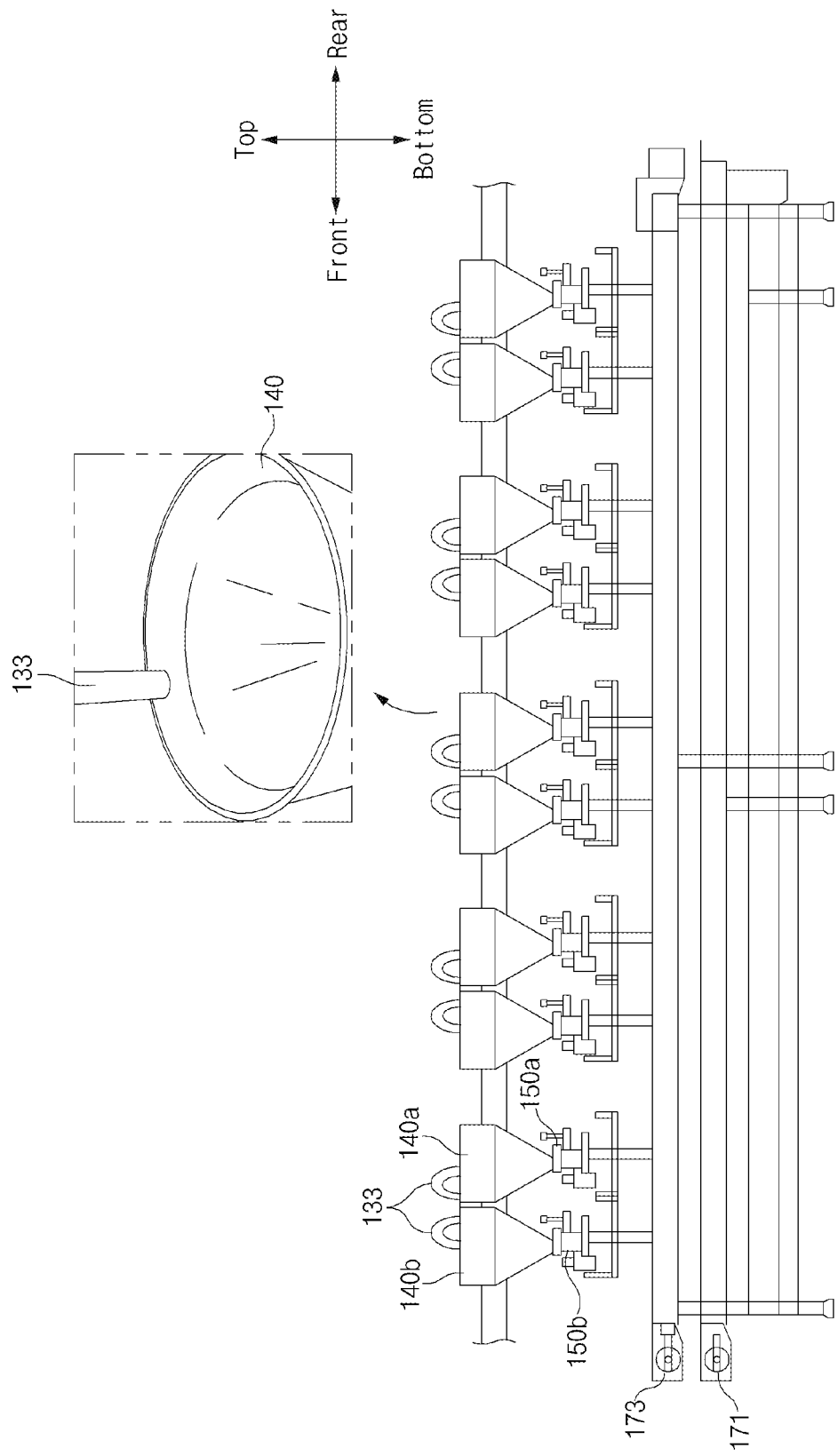
FIGS. 3A and 3B are side views of the he Kimchi stuffing putting device of FIG. 1.
Figure 3B:
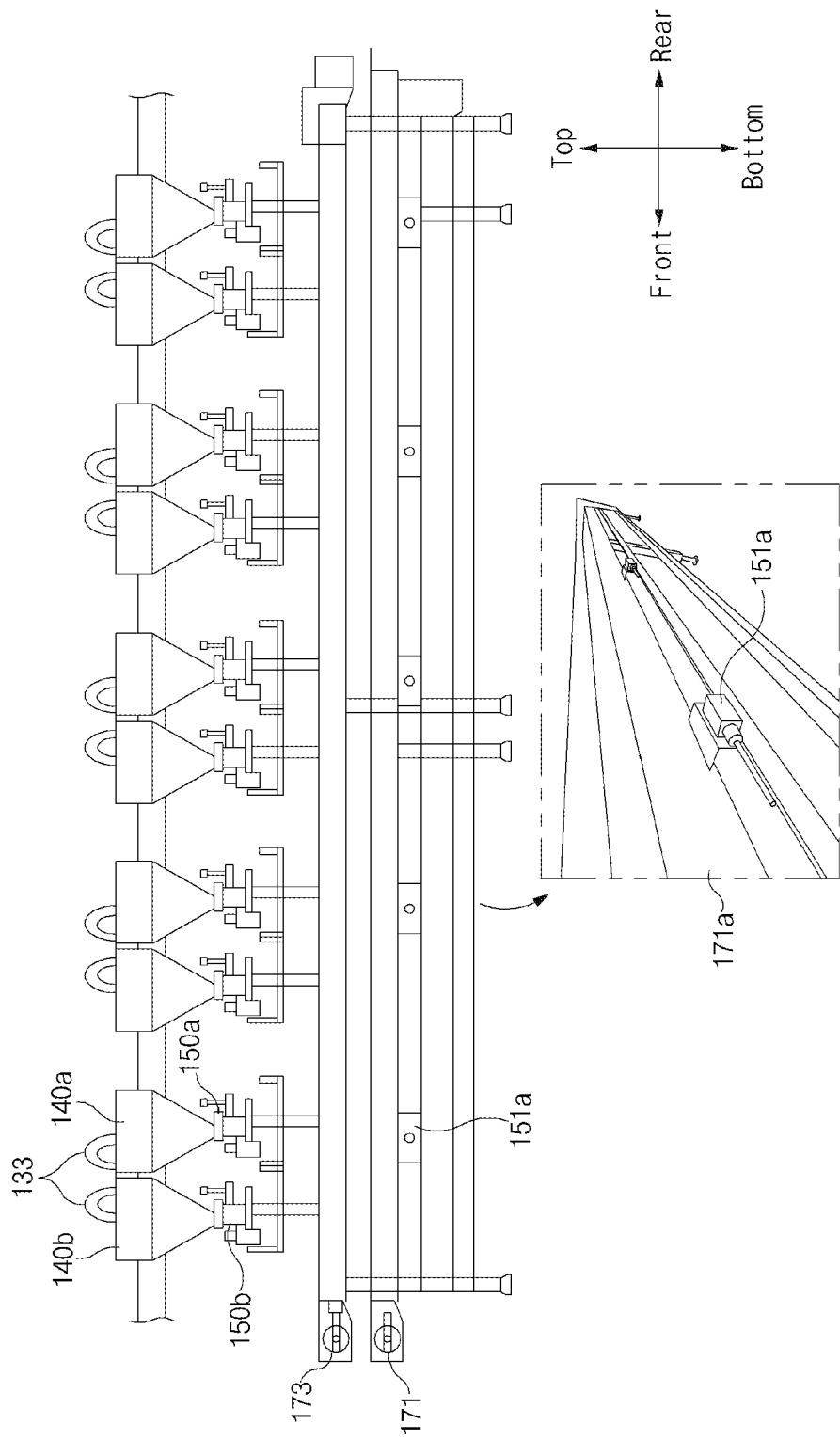

FIG. 2 is a plan view of the Kimchi stuffing putting device of FIG. 1, and FIGS. 3A and 3B are side views of the he Kimchi stuffing putting device of FIG. 1.

When the hopper 140, the spraying mechanism 150, and the Kimchi stuffing putting working table 160 are referred to as a Kimchi stuffing putting unit, a plurality of Kimchi stuffing putting units may be arranged in a front-rear direction.

The Kimchi stuffing putting device 100 may include that cabbage introducing conveyors 171a and 171b that are provided in a caterpillar shape to continuously transfer cabbages in the front-rear direction in which the plurality of Kimchi stuffing putting units are arranged.

The cabbages may be transferred toward the Kimchi stuffing putting units through the cabbage introducing conveyors 171a and 171b.

The cabbage introducing conveyors 171a and 171b may include first and second cabbage introducing conveyors 171b arranged left and right while being in parallel to each other.

The Kimchi stuffing putting device 100 may further include a Kimchi discharging conveyor 173 that are provided in a caterpillar shape to continuously transfer Kimchi having seasoning sprayed therein.

The first and second cabbage introducing conveyors 171b may be disposed at the left and right sides of the Kimchi discharging conveyor 173 positioned at the center.

Referring to FIG. 3A, according to an embodiment, the Kimchi discharging conveyor 173 may be installed at a higher position than positions of the cabbage introducing conveyors 171a and 171b. When performing work of putting Kimchi stuffing, a worker moves the cabbage "B", which is introduced through the cabbage introducing conveyors 171a and 171b, onto the Kimchi stuffing putting working table 160 such that the Kimchi stuffing is sprayed onto the cabbage "B", and places the Kimchi "K" having the Kimchi stuffing sprayed therein on the Kimchi discharging conveyor 173 such that the Kimchi "K" is discharged. The Kimchi discharging conveyor 173 may be installed at a higher position than positions of the cabbage introducing conveyors 171a and 171b to allow the worker to easily move the Kimchi from the Kimchi stuffing putting working table 160 onto the Kimchi discharging conveyor 173.

Referring to FIG. 3B, the spraying mechanism switch 151 may be mounted at one sides of the cabbage introducing conveyors 171a and 171b. The spraying mechanism switch 151 may be mounted on an outside, which is opposite to an inside having the Kimchi discharging conveyor 173, of the cabbage introducing conveyors 171a and 171b. In other words, the spraying mechanism switch 151 may be mounted in a direction of being exposed to the outside of the Kimchi stuffing putting device 100.

For example, the spraying mechanism switch 151 may be provided to be mounted at the outside of the cabbage introducing conveyors 171a and 171b corresponding to the height where the knees of the user reach, such that the user "P" is able to conveniently perform a switch operation during the work.

The spraying mechanism switch 151 may include various types of switches as long as the switches are simply operated.

For example, the spraying mechanism switch 151 may include a push-type switch including a moving member moving between a first position and a second position through a pressing operation.

For example, the spraying mechanism switch 151 may include a lever-type switch including a moving member moving between a third position and a fourth position through a pulling operation and a pushing operation.

The Kimchi stuffing putting unit may include first Kimchi stuffing putting units mounted on the first cabbage introducing conveyor 171a and second Kimchi stuffing putting units mounted on the second cabbage introducing conveyor 171b.

According to an embodiment, the first and second Kimchi stuffing putting units are provided such that the second Kimchi stuffing putting unit is interposed between the first Kimchi stuffing putting units adjacent to each other without overlapping in a left-right direction.

According to an embodiment, the first and second Kimchi stuffing putting units may be disposed such that a non-overlap area of the first and second Kimchi stuffing putting units is wider than an overlap area of the first and second Kimchi stuffing putting units at least between the first and second Kimchi stuffing putting units when viewed based on the left-right direction. Referring to FIGS. 2 and 3A, each Kimchi stuffing putting unit including the spraying mechanism 150 requires a specific space for mounting. The first and second Kimchi stuffing putting units may be disposed in a zigzag pattern without overlapping in the left-right direction or at least in a manner that non-overlap areas of the first and second Kimchi stuffing putting units are wider than an overlap area of the first and second Kimchi stuffing putting units, thereby realizing the Kimchi stuffing putting device 100 in smaller size and effectively arranging the components of the Kimchi stuffing putting device 100.

According to an embodiment, the Kimchi stuffing putting unit may be configured such that seasoning is supplied away from the hopper 140 nearest to the seasoning transferring pump 130, while the seasoning is supplied to every one or two hoppers 140. In this case, the seasoning transferring pump 130 is driven in the state that one or two branching pipe valves 134 are open and remaining branching pipe valves 134 are closed, such that the seasoning may be supplied to every one or two hoppers 140. However, the above case is provided only for the illustrative purpose, and the Kimchi stuffing putting unit may be configured in various manners. For example, the seasoning is supplied away from the hopper 140 nearest to the seasoning transferring pump 130, while the seasoning is simultaneously supplied to all hoppers 140. In this case, the seasoning transferring pump 130 is driven in the state that all branching pipe vales 134 are open and the seasoning is supplied to all hoppers 140.

The Kimchi stuffing putting device 100 may include a controller (not illustrated). The overall configuration of the Kimchi stuffing putting device 100 described above may be controlled by the controller.

The controller may control the dumping lifter 110, the seasoning transferring pump 130, the branching pipe valves 134, the spraying mechanisms 150, the cabbage introducing conveyors 171a and 171b, the Kimchi discharging conveyor 173, the recovering valve 136, and the seasoning recovering pump 180

The controller may provide a control signal to the dumping lifter 110 to move up and dump the movable tank 10, when determining an amount of seasoning received in the Kimchi stuffing seasoning storage tank 105 as being less than a specific amount, based on the signal received from the seasoning tank sensor.

The controller may provide a control signal to drive the seasoning transferring pump 130 to receive the seasoning from the Kimchi seasoning storage tank 105 and supply the seasoning to the transferring pipe 131.

The controller may provide a control signal to the branching pipe valve 134 and the seasoning transferring pump 130 such that the seasoning transferring pump 130 is driven in the state that the branching pipe valve 134 is open, to supply seasoning into the hopper 140 through the branching pipe 133.

According to an embodiment, the controller may provide a control signal to the branching pipes 134 such that seasoning is supplied away from the hopper 140 nearest to the seasoning transferring pump 130, while the seasoning is supplied to every one or two hoppers 140. The controller may provide a control signal to the branching pipes 134 may provide a control signal to the branching pipe valves 134 and the seasoning transferring pump 130 such that the seasoning transferring pump 130 is driven and the seasoning is supplied to the one or two hoppers 140 in the state that one or two branching pipe valves 134 are open and the remaining branching valves 134 are closed.

The controller may control the spraying mechanism 150 to be turned on or turned off, when receiving a control signal from the spraying mechanism switch 151. The controller may provide a control signal to the spraying mechanism 150 such that a specific amount of seasoning is periodically sprayed, when the spraying mechanism 150 is turned on.

The controller may provide a control signal to drive the cabbage introducing conveyors 171a and 171b and the Kimchi discharging conveyor 173. The controller may provide a control signal to drive the cabbage introducing conveyors 171a and 171b and the Kimchi discharging conveyor 173 when the spraying mechanism 150 is turned on.

The controller may control the branching pipe valve 134 to be open and control the recovering valve 136 to be closed during the supply of the seasoning to the hopper 140.

The controller may control the branching pipe valves 134 to be closed and the seasoning recovering pump 180 to be driven in the state that the recovering valve 136 is open such that the seasoning received in the transferring pipe 131 is recovered into the Kimchi stuffing seasoning recovering tank 20.

Dumping Lifter

Figure 4:
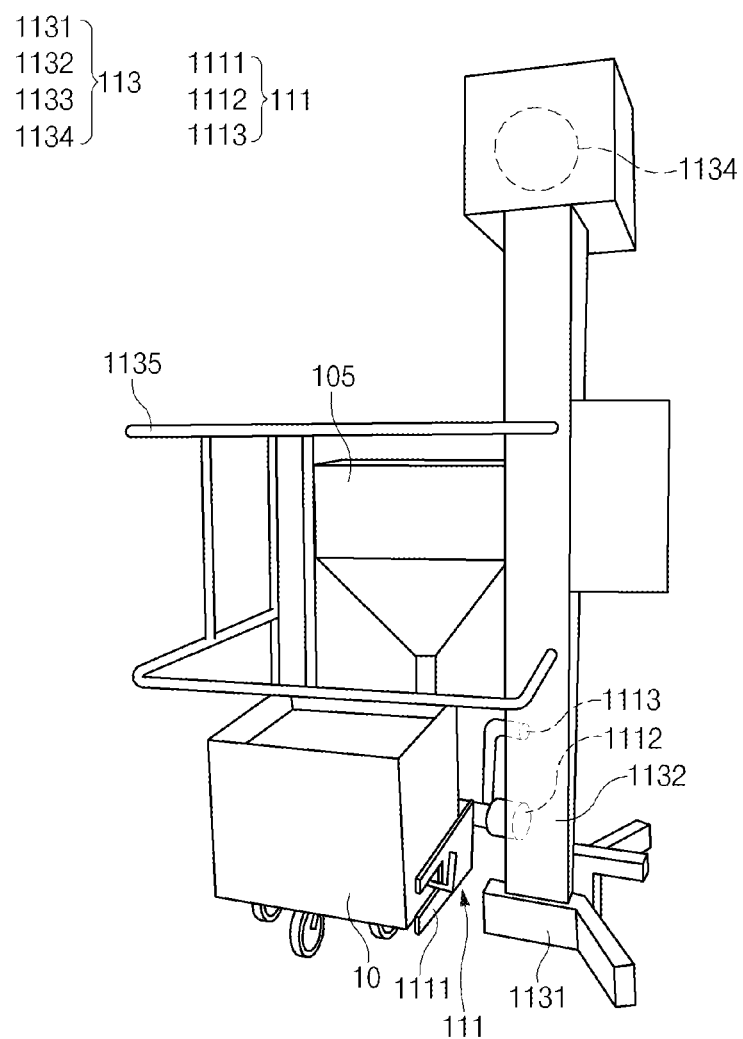
FIG. 4 is a perspective view of a dumping lifter provided in a Kimchi stuffing putting device, according to an embodiment of the present disclosure.
Figure 5:
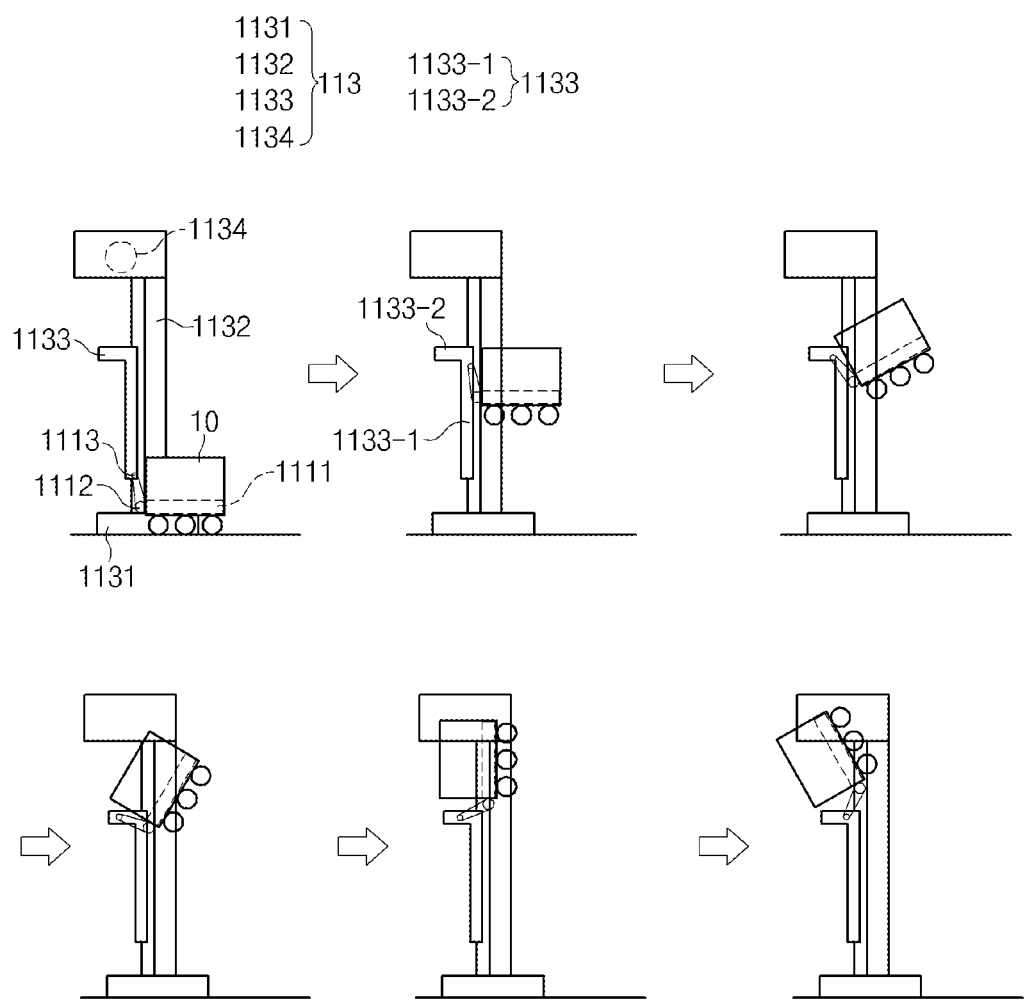
FIG. 5 is a view illustrating the operation of the dumping lifter of FIG. 4.

FIG. 4 is a perspective view illustrating a dumping lifter provided in a Kimchi stuffing putting device, according to an embodiment of the present disclosure, and FIG. 5 is a view illustrating the operation of the dumping lifter of FIG. 4.

The dumping lifter 110 includes a docking member 111 provided to be coupled to the movable tank 10, and a tower member 113 coupled to the docking member 111 and provided to move up or move down the docking member 111.

The movable tank 10 may include a movable tank docking part coupled with the docking member 111 of the dumping lifter 110.

The tower member 113 may include a base 1131 having a contact surface with the floor, a driver 1134 to provide driving force to move up the docking member 111, a vertical extension part 1132 extending upward from the base 1131 to receive a power transmitting member (not illustrated) that transmits the driving force of the driver 1134 to the docking member 111, and a guide rail 1133 extending in a first direction from an upper end extending in a top-bottom direction after extending by a specific length in the top-bottom direction.

A first direction may be defined as a direction of employing, as a main directional component, a directional component horizontal to the ground surface and facing an opposite side to one side, which couples the docking member 111 to the movable tank 10, of the vertical extension part 1132. Alternatively, the first direction may be defined as a direction parallel to a direction that the movable tank 10 moves to be coupled to the docking member 111, or a direction of employing a parallel directional component as a main direction component.

The base 1131 is a member to firmly support the dumping lifter 110 while preventing the dumping lifter 110 from being inclined to one side. The dumping lifter 110 moves up the movable tank 10 to a specific height and rotates the movable tank 10, when operating. In this case, the dumping lifter 110 needs to be firmly fixed during the operation, and the base 113' may be provided in various shapes based on the size and the weight of the dumping lifter 110 and the movable tank 10.

The driver 1134 may be configured to include a driving motor. Referring to FIG. 4, the diver 1134 may be disposed at the upper portion of the vertical extension part 1132.

According to an embodiment, the driving motor may be provided to move up and rotate the movable tank 10 by rotating the power transmitting including chains. Accordingly, the driving motor may efficiently use driving force in moving up and rotating the movable tank 10 while moving up the chains included in the power transmitting member.

The vertical extension part 1132 may extend upward from the base 1131, and may have an inner space to receive the power transmitting member. The vertical extension part 1132 may include the guide rail 1133.

The guide rail 1133 may extend by a specific length in the top-bottom direction, and may be bent in the first direction from an upper end extending in the top-bottom direction while extending. The guide rail 1133 may have a bending part formed as the extending portion in the top-bottom direction meets the extending portion in the first direction, and the bending part is rounded such that the extending portion in the top-bottom direction is smoothly connected with the extending portion in the first direction.

The docking member 111 may include a docking part 1111 coupled to the movable tank 10, a driving arm 1112 coupled to the power transmitting member, and a guide arm 1113 provided to be movable along the guide rail 1133, and positioned above the driving arm 1112.

The docking part 1111 may include a fixing device which is coupled to the movable tank docking part, and prevents the movable tank 10 from being separated in the above coupling state.

The driving arm 1112 may be coupled to the power transmitting member to move up the movable tank 10. The driving arm 1112 may move in the vertical direction by the driver 1134. The tower member 113 may include a guide member to guide the vertical movement of the driving arm 1112

The guide arm 1113 may be provided to be movable along the guide rail 1133, as a portion of the guide arm 1113 is inserted into the guide rail 1133.

Hereinafter, the operating principle of the dumping lifter 110 will be described with reference to FIG. 5.

First, the movable tank 10 is coupled to the docking member 111 in the state that the docking member 111 is positioned at the lower most portion of a moving range.

The driver 1134 is driven, and the docking member 111 is moved up together with the movable tank 10.

When the docking member 111 is moved up to a specific height, the guide arm 1113 moves in the first direction along the guide rail 1133 while the driving arm 1112 continuously moves up. In this case, as the guide arm 1113 moves in a direction of employing the horizontal directional component as a main directional component, and the driving arm 1112 moves in a direction of employing the vertical directional component as a main directional component, the docking member 111 rotates, and the movable tank 10 coupled to the docking member 111 rotates together with the docking member 111.

When the driving arm 1112 continuously moves up, the guide arm 1113 moving along the guide rail 1133 moves back by a specific distance in a direction opposite to the first direction.

As the dumping lifter 110 operates as described above, the movable tank 10 may rotate at 90 degrees about an original position thereof. Accordingly, the seasoning stored in the movable tank 10 may be effectively discharged into the Kimchi stuffing seasoning storage tank 105.

Meanwhile, the dumping lifter 110 should be designed based on the position and the shape of the Kimchi stuffing seasoning storage tank 105 to exactly supply the seasoning into the Kimchi stuffing seasoning storage tank without leaking, when the seasoning in the movable tank 10 is supplied into the Kimchi stuffing seasoning storage tank 105 as the dumping lifter 110 operates.

A vertical distance "L2" between the guide arm 1113 and the driving arm 1112 of the docking member 111 and a length "L3" of the guide rail 1133 extending in the first direction should be designed, based on a horizontal distance "L1" between the movable tank 10 and the Kimchi stuffing seasoning storage tank 105, in the state that the movable tank 10 is coupled to the dumping lifter 110. As illustrated in FIG. 5, the movable tank 10 is moved up, moved forward by a specific distance in the first direction, and rotated during the operation of the dumping lifter 110.

For example, when the horizontal distance "L1" is 50 cm, and when the dumping lifter 110 is operated, the movable tank 10 should be moved to 50 cm or more into the Kimchi stuffing seasoning storage tank 105. To this end, the length "L3" of the guide rail 1133 extending in the first direction should be designed to be greater than 50 cm, and the length of the guide arm 1113 should be designed to be greater than 50 cm. In other words, the dumping lifter 110 should be designed such that lengths "L1", "L2", and "L3" are proportional to each other.

Meanwhile, when the movable tank 10 is moved down, the above-described moving-up procedure may be reversely performed.

Packaging Mechanism

Figure 6:
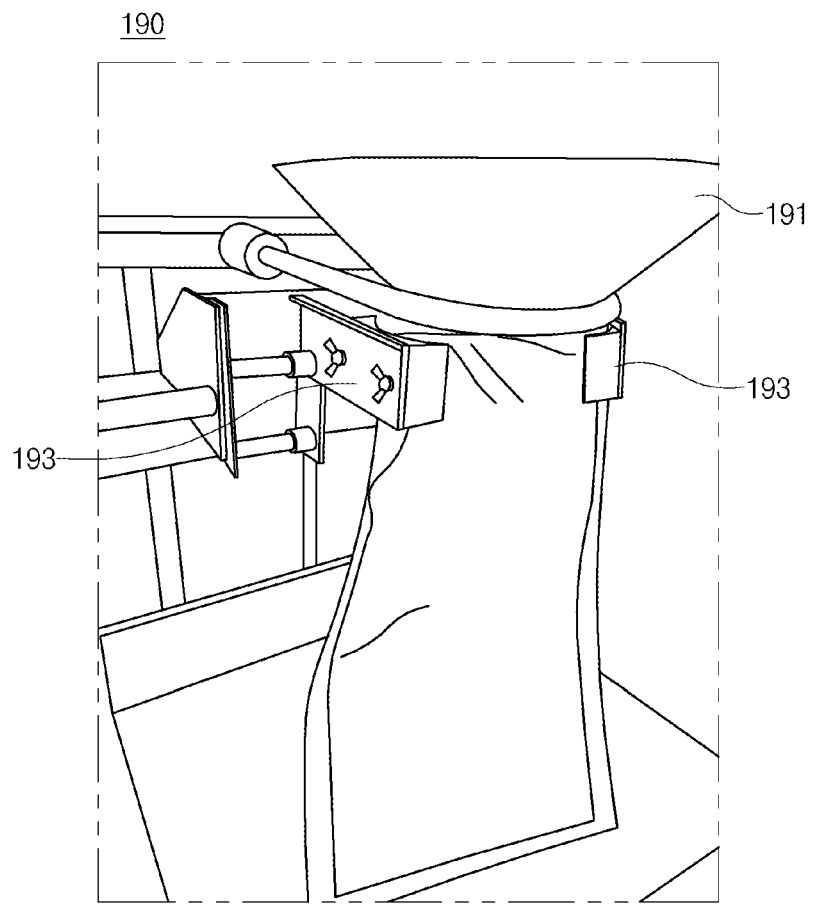
FIG. 6 is a perspective view of a packaging mechanism provided in a Kimchi stuffing putting device, according to an embodiment of the present disclosure.

FIG. 6 is a perspective view of a packaging mechanism provided in a Kimchi stuffing putting device, according to an embodiment of the present disclosure.

The Kimchi stuffing putting device 100 may further include a packaging mechanism 190 to package Kimchi.

The packaging mechanism 190 may include a guiding member 191 having a funnel shape and a gripping member 192 to closely fix packaging paper, which is fitted around one end of the guiding member 191, to the guiding member 191. The gripping member 192 may be driven to approach toward the guiding member 191 or to be away from the guiding member 191.

The gripping member 192 may be driven to approach toward the guiding member 191 or to be away from the guiding member 191 through a user operation.

A member, which enhances frictional force to increase fixing force of the packaging paper, may be provided in a contact part, which makes contact with the packaging paper, of the gripping member 192. In addition, the contact part, which makes contact with the packaging paper, of the gripping member 192 may be formed in the shape corresponding to the shape of the guiding member 191.

Conventionally, since there are necessary at least two workers, which are a person gripping the packaging paper and a person placing a cabbage in the packaging paper, to package the cabbage by placing the cabbage in the packaging paper while gripping the packaging paper, the packaging efficiency is degraded. According to the present disclosure, the packaging mechanism 190 is provided in the Kimchi stuffing putting device 100, thereby allowing one worker to package Kimchi.

Spraying Mechanism

Figure 7:
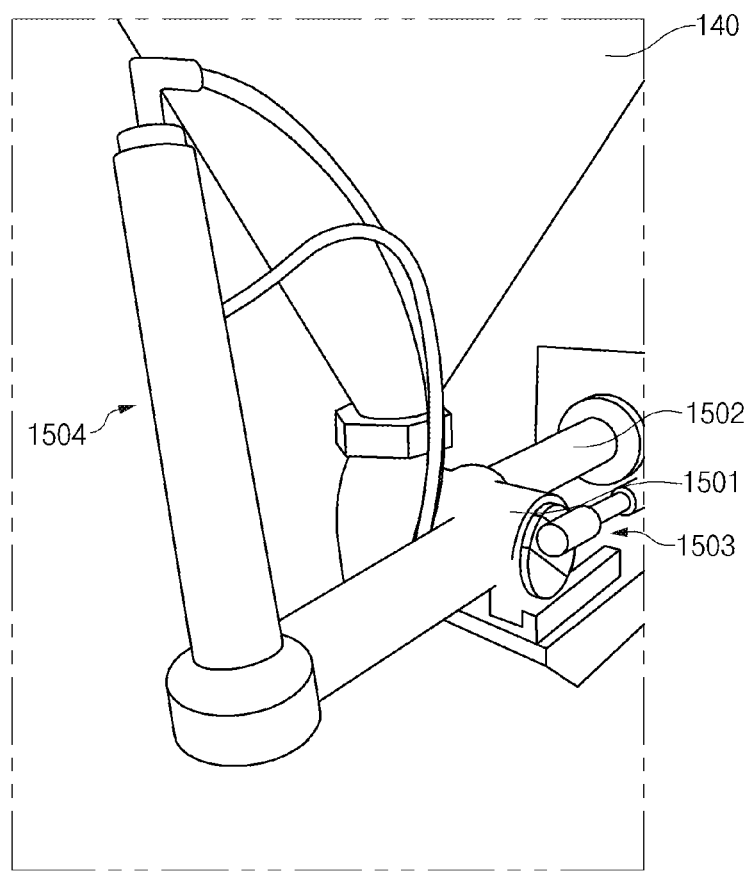
FIG. 7 is a perspective view of a spraying mechanism provided in a Kimchi stuffing putting device, according to an embodiment of the present disclosure.
Figure 8:
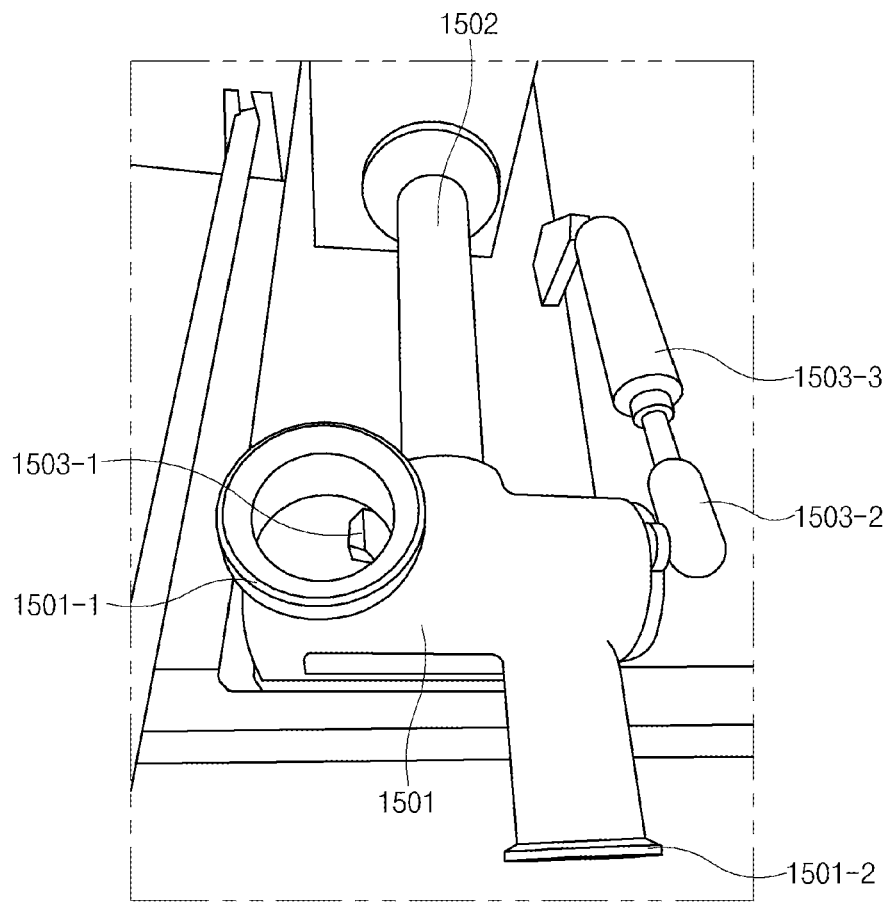
FIG. 8 is a view illustrating some components of the spraying mechanism of FIG. 7.

FIG. 7 is a perspective view of a spraying mechanism provided in the Kimchi stuffing putting device according to an embodiment of the present disclosure, and FIG. 8 is a view illustrating some components of the spraying mechanism of FIG. 7.

The spraying mechanism 150 may include a body part 1501, a seasoning amount adjusting cylinder 1502, a transferring device 1503, and a discharging valve 1504.

The body part 1501 may include an introducing stage 1501-1 to introduce seasoning into the introducing stage 1501-1 and a discharging stage 1501-2 to discharge the seasoning to the outside. The introducing stage 1501-1 may be coupled to a lower end portion of the hopper 140 and provided such that seasoning is introduced by the weight of the seasoning into the body part 1501 from the hopper 140.

The body part 1501 may has an inner space provided in a cylindrical shape and may have a shape in which one side is open when viewed based on the central axis of the cylinder.

The seasoning amount adjusting cylinder 1502 may communicate with the body part 1501 at one end portion thereof, may be provided to suction the seasoning from the body part 1501 and discharge the suctioned seasoning through the body part 1501, as a piston slides.

The transferring device 1503 may be provided to transfer the seasoning, which is discharged from the seasoning amount adjusting cylinder 1502, to the discharging stage 1501-2.

The transferring device 1503 may include a screw 1503-1 which is provided to be rotated about an axis in the body part 1501, and screw driving members 1503-2 and 1503-3 to provide driving force to rotate the screw 1503-1.

The screw 1503-1 may be inserted into the open one side of the body part 1501 and may be coupled rotatably to the body part 1501. The screw 1503-1 may be formed in size at least partially making contact with the inner surface of the body part 1501

The contactable part of the body part 1501 with the screw 1503-1 may be provided to reduce frictional force. For example, at least a portion of the inner surface of the body part 1501 may be treated. For example, the body part 1501 may include a member, which reduces frictional force, covered on the inner surface of the body part 1501 contactable with the screw 1503-1.

The screw driving members 1503-2 and 1503-3 may include a driving rod 1503-2 and a transferring cylinder 1503-3. One end of the driving rod 1503-2 is connected with a portion, which is exposed to the outside of the body part 1501, of the screw 1503-1. The transferring cylinder 1503-3 is installed to linearly move the driving rod 1503-2 such that the screw 1503-1 rotates through the linear movement of the driving rod 1503-1.

The discharging valve 1504 may be provided to open or close the discharging stage 1501-2. The discharging valve 1504 may include a valve cap and a valve driving cylinder to drive the valve cap.

The spraying mechanism 150 configured as described above may be provided to adjust at least one of an amount of sprayed seasoning and a period of spraying seasoning.

For example, an amount of seasoning sprayed per period by the spraying mechanism 150 may be adjusted by adjusting the front and rear sliding range of the seasoning amount adjusting cylinder 1502.

For example, the period of spraying seasoning may be adjusted by increasing the operating speed of the seasoning amount adjusting cylinder 1502, the transferring cylinder 1503-3, and a valve driving cylinder.

Other Embodiments

Figure 9:
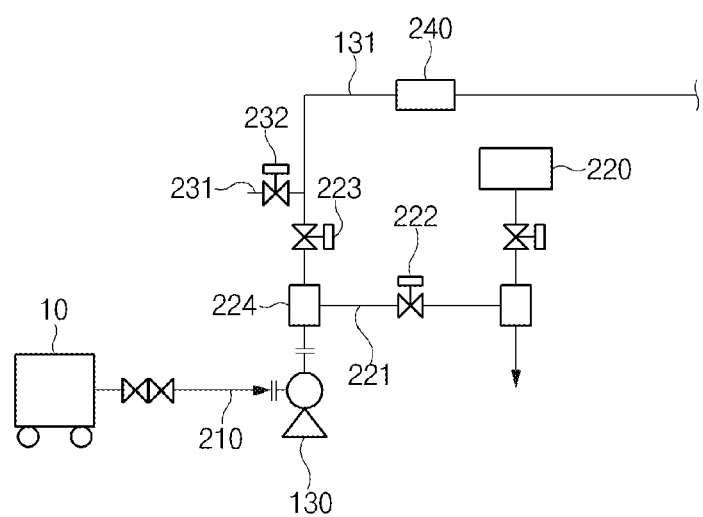
FIG. 9 is a view illustrating a Kimchi stuffing putting device, according to another embodiment of the present disclosure.

FIG. 9 is a view illustrating a Kimchi stuffing putting device, according to another embodiment of the present disclosure.

An embodiment of the present disclosure to be described with reference to FIG. 9 has differences from an embodiment described with reference to FIGS. 1 to 8 in that the movable tank 10 receiving Kimchi stuffing seasoning is directly connected with the seasoning transferring pump 130, and in that an ejector 220 and an ejecting pipe 221 are provided to effectively move the Kimchi stuffing seasoning through the transferring pipe 131 at the initial stage of transferring seasoning.

The following description will be made while focusing on the difference between the Kimchi stuffing putting device 200 according to another embodiment of the present disclosure made with reference to FIG. 9 and the Kimchi stuffing putting device 100 according to an embodiment of the present disclosure.

According to the present embodiment, the Kimchi stuffing putting device 200 may be provided such that the movable tank 10 to receive the Kimchi stuffing seasoning is directly connected with the seasoning transferring pump 130 without the dumping lifter 110. For example, the movable tank 10 and the seasoning transferring pump 130 may be directly connected with each other through a movable tank connection pipe 210. In this case, the Kimchi stuffing putting device 200 may not include the Kimchi stuffing seasoning storage tank 105.

According to the direct connection manner, the Kimchi stuffing seasoning may not autonomously arrive at the seasoning transferring pump 130 from the movable tank 10 due to the viscosity of the Kimchi stuffing seasoning.

To solve the above problem, the Kimchi stuffing putting device 200 may further include the ejector 220 connected with the seasoning transferring pump 130 and the transferring pipe 131. The ejector 220 may discharge internal air from the transferring pipe 131 and the movable tank connection pipe 210, thereby effectively removing the internal air of the pipe. Accordingly, the Kimchi stuffing seasoning may effectively arrive at the seasoning transferring pump 130 from the movable tank 10. For example, the ejector 220 may include a vacuum ejector.

Regarding the detailed description made with reference to FIG. 9, the Kimchi stuffing putting device 200 may include the ejector 200, the ejecting pipe 221, and an ejecting valve 222.

The ejecting pipe 221 may branch from the transferring pipe 131 upstream of the branching pipe 133, when viewed based on the moving direction of the seasoning in the transferring pipe 131.

The ejecting valve 222 may be provided to open or close the ejecting pipe 221.

The ejector 220 may be provided to force a fluid (e.g., air or Kimchi stuffing seasoning) to flow from the transferring pipe 131 to the ejecting pipe 221.

The Kimchi stuffing putting device 200 may further include a transferring pipe valve 223 mounted downstream from a point, from which the ejecting pipe 221 branches, of the transferring pipe 131, when viewed based on the moving direction of the seasoning in the transferring pipe 131.

The Kimchi stuffing putting device 200 may include a seasoning sensor 224 mounted at the point, from which the ejecting pipe 221 branches, of the transferring pipe 131, or upstream of the point from which the ejecting pipe branches, when viewed based on the moving direction of the seasoning in the transferring pipe 131 to sense the seasoning.

Alternatively, the seasoning sensor 224 may be provided on the transferring pipe 131, and may be provided amount a first automatic valve, a second automatic valve, and the seasoning transferring pump 130.

The position of the sensor is provided for the illustrative purpose, but the present disclosure is not limited thereto.

The seasoning sensor 224 may be provided to generate a signal to control the operation of at least one of the ejector 220, the ejecting valve 222, the transferring pipe valve 223, or the seasoning transferring pump 130, when sensing the Kimchi stuffing seasoning.

Alternatively, the seasoning sensor 224 may be provided to apply a control signal to at least one of the ejector 220, the ejecting valve 222, the transferring pipe valve 223, or the seasoning transferring pump 130, when sensing the Kimchi stuffing seasoning.

In other words, the seasoning sensor 224 may determine whether the Kimchi stuffing seasoning arrives at a sensing area of the seasoning sensor 224 after passing through the seasoning transferring pump 130, and may change the driving state of at least one of the ejector 220, the ejecting valve 222, the transferring pipe valve 223, or the seasoning transferring pump 130 when the Kimchi stuffing seasoning is included in the sensing area.

For example, the seasoning sensor 224 may transmit sensing data to the controller (not illustrated) and the controller (not illustrated) may control components of the Kimchi stuffing putting device 200.

According to an embodiment, the seasoning sensor 224 may include a transparent pipe (not illustrated) mounted downstream from the point, from which the ejecting pipe 221 branches, when viewed based on the moving direction of the seasoning in the transferring pipe 131.

In this case, the ejecting valve 222 and the transferring pipe valve 223 may be manually controlled. When the ejecting valve 222 and the transferring pipe valve 223 may be manually controlled, and when the seasoning is identified in the transparent pipe of the seasoning sensor 224 with naked eyes of the user, the ejecting valve 222 is closed, and the transferring pipe valve 223 is open, such that the Kimchi stuffing seasoning is transferred through the hopper 140.

Alternatively, a light receiving part (not illustrated) and a light emitting part (not illustrated) are installed in the transparent pipe of the seasoning sensor 224 to sense that the Kimchi stuffing seasoning is introduced into the transparent pipe. For example, a specific amount of light may not be sensed in the light receiving part, which may be determined light, which is emitted from the light emitting part, as being blocked by seasoning. Accordingly, the ejecting valve 222 may be closed and the transferring pipe valve 223 may be open. In addition, the ejector 220 may be provided to be stopped when the ejecting valve 222 is closed. Such a control may be performed in response to a control signal applied from the seasoning sensor 224 to the ejecting valve 222, the transferring pipe valve 223, and the ejector 220, or may be performed in response to a control signal applied from the controller (not illustrated) to the ejecting valve 222, the transferring pipe valve 223, and the ejector 220, based on the sensing signal applied from the seasoning sensor 224 to the controller.

Hereinafter, the driving of the Kimchi stuffing putting device 200 will be described.

(First step) A transferring air flow may be formed from the movable tank 10 to the ejecting pipe 221, as the ejector 220 is driven in the state that the movable tank 10 is connected with the movable tank connection pipe 210, the ejecting valve 222 is open, and the transferring pipe valve 223 is closed. Accordingly, the Kimchi stuffing seasoning having higher viscosity may be effectively transferred from the movable tank 10 to the seasoning transfer pump 130. When the ejector 220 is driven, the seasoning transferring pump 130 may be driven together with the ejector 220, and may perform a pumping operation to transfer the Kimchi stuffing seasoning to the transferring pipe 131.

(Second step), when the Kimchi stuffing seasoning is sensed by the seasoning sensor 224, the driving of the ejector 220 may be stopped, the ejecting valve 222 may be closed, and the transferring pipe valve 223 may be open. Accordingly, the seasoning transfer pump 130 may transfer the Kimchi stuffing seasoning to the hopper 140 along the transferring pipe 131.

When the revolution per minute (RPM) of the seasoning transferring pump 130 is a first RPM in the state that the ejector 220 is operated, the seasoning transferring pump 130 may be provided to be driven at a second RPM higher than the first RPM in the state that the ejector is stopped.

For example, the first RPM may be set to about 20 rpm.
For example, the second RPM may be set to about 40 rpm.

As described above, the RPM of the seasoning transferring pump 130 is set to different values in the first step and the second step. Accordingly, the ejector 220 is prevented from being damaged as the seasoning is introduced into the ejector 220 in the first step. In the first step, since it is sufficient that the Kimchi stuffing seasoning only arrives at the sensing position of the seasoning sensor 224, the seasoning transferring pump 130 is driven at an RPM lower than that in the second step, thereby preventing the ejector 220 from being damaged.

Meanwhile, in the second step, since the Kimchi stuffing seasoning has to be transferred to a plurality of hoppers 140 arranged along the transferring pipe 131, the seasoning transferring pump 130 is set to be driven at a higher RPM, thereby effectively transferring the Kimchi stuffing seasoning.

In addition, the Kimchi stuffing putting device 200 may further include a seasoning recovering pipe 231 and a seasoning recovering valve 232.

The seasoning recovering pipe 231 may branch from the transferring pipe 131. The seasoning recovering valve 232 may be provided to open or close the seasoning recovering pipe 231.

Hereinafter, the operation of the Kimchi stuffing putting device 200, which further includes the seasoning recovering pipe 231 and the seasoning recovering valve 232, will be described.

When the seasoning is recovered, the transferring valve 223 and a plurality of branching pipe valve 134 are closed, and the seasoning recovering valve 232 is open, such that external air is introduced into the transferring pipe 131. Simultaneously, the seasoning recovering tank 180 may be driven and the Kimchi stuffing seasoning may be recovered into the Kimchi stuffing seasoning storage tank 20.

Meanwhile, the Kimchi stuffing putting device 200 may further include a transparent pipe 240 mounted on the transferring pipe 131 to identify the Kimchi stuffing seasoning, which is transferred through the transferring pipe 131, with naked eyes of a user. The transparent pipe 240 forms a portion of the transferring pipe 131, and at least a portion of the transparent pipe 240 is transparently provided such that the Kimchi stuffing seasoning, which is transferred through the transparent pipe 240, is identified with naked eyes of a user.

The above-described disclosure is able to be implemented with computer-readable codes on a medium having a program. Computer-readable medium includes all types of recording devices having data which is readable by a computer system. For example, the computer-readable medium includes a hard disk drive (HDD), a solid state disk (SSD), a silicon disk drive (SDD), a ROM, a RAM, a CD-ROM, a magnetic tape, a floppy disk, or an optical data storage device. In addition, the recording medium is implemented in the form of carrier waves (e.g., transmission over the Internet). In addition, the computer may include a processor or a controller. Accordingly, the detailed description should be understood by way of example instead of being limitedly interpreted in terms of all aspects. The scope of the present disclosure should be determined by the reasonable interpretation of attached claims, and the equivalents of the present disclosure falls within the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A Kimchi stuffing putting device comprising:
   a Kimchi stuffing seasoning storage tank;
   a seasoning transferring pump configured to receive seasoning from the Kimchi stuffing seasoning storage tank and to supply the seasoning to a transferring pipe;
   a hopper configured to receive the seasoning from the transferring pipe through a branching pipe branching from the transferring pipe and to temporarily store the seasoning;
   a spraying mechanism mounted at an end portion of the hopper to selectively spray the seasoning; and
   a seasoning recovering pump configured to recover the seasoning, which is supplied through the transferring pipe, into a Kimchi stuffing seasoning recovering tank, wherein the spraying mechanism is turned on or turned off, wherein the spraying mechanism is provided to periodically spray a specific amount of seasoning when the spraying mechanism is turned on, and wherein the seasoning recovering pump is connected with an end portion opposite to one end portion, which is connected with the seasoning transferring pump, of the transferring pipe.

2. The Kimchi stuffing putting device of claim 1, further comprising:

a cabbage introducing conveyor to continuously transfer a cabbage and disposed under the spraying mechanism when viewed based on a gravity direction, wherein the spraying mechanism includes:

a switch mounted at one side of the cabbage introducing conveyor to turn on or turn off the spraying mechanism.

3. The Kimchi stuffing putting device of claim 1, further comprising:

a branching pipe valve configured to open or close the branching pipe; and a hopper sensor configured to sense an amount of seasoning received in the hopper, wherein the branching pipe and the seasoning transferring pump are provided such that the seasoning transferring pump is driven in a state that the branching pipe valve is open and the seasoning is supplied to the hopper, when the amount of seasoning received in the hopper is less than a specific amount.

4. The Kimchi stuffing putting device of claim 1, wherein the branching pipe includes:

a plurality of branch pipes branching from the transferring pipe, wherein the hopper includes:

a plurality of hoppers to receive seasoning from the branch pipes, respectively, wherein the spraying mechanism includes:

a plurality of spraying mechanisms mounted at end portions of the hoppers, respectively, and wherein the Kimchi stuffing putting device further includes:

a cabbage introducing conveyor provided in a caterpillar shape to continuously transfer a cabbage in a direction that the plurality of spraying mechanisms are disposed.

5. The Kimchi stuffing putting device of claim 4, further comprising:

a Kimchi discharging conveyor provided in parallel to the cabbage introducing conveyor and provided in a caterpillar shape to continuously transfer Kimchi on which the seasoning is sprayed.

6. The Kimchi stuffing putting device of claim 1, wherein the branching pipe includes:

a plurality of branch pipes branching from the transferring pipe, wherein the hopper includes:

a plurality of hoppers to receive seasoning from the branch pipes, respectively, wherein the spraying mechanism includes:

a plurality of spraying mechanisms mounted at end portions of the hoppers, respectively, wherein the Kimchi stuffing putting device further includes:

a plurality of branching pipe valves configured to open or close the plurality of branching pipes, and wherein the plurality of branching pipe valves and the seasoning transferring pump are provided such that the seasoning is supplied away from a hopper located nearest to the seasoning transferring pump, the seasoning transferring pump is driven in a state that one or two branching pipe valves are open and remaining branching pipe values are closed, and the seasoning is supplied to every one or two hoppers.

7. The Kimchi stuffing putting device of claim 1, further comprising:

a branching pipe valve configured to open or close the branching pipe; and a recovering valve configured to allow the seasoning to be introduced into the seasoning recovering pump or block the seasoning from being introduced into the seasoning recovering pump, wherein the recovering valve is closed while the branching pipe valve is open, and wherein the seasoning recovering pump is provided to be driven in a state that the branching pipe valve is closed and the recovering valve is open, such that the seasoning is recovered into the Kimchi stuffing seasoning storage tank.

8. The Kimchi stuffing putting device of claim 1, wherein the transferring pipe includes a pig ball introducing port which is provided in one end portion, which is connected with the seasoning transferring pump, of the transferring pipe; and a pig ball discharging port which is provided in an end portion, which is opposite to the one end portion, of the transferring pipe, such that seasoning remaining inside the transferring pipe is recovered using a pig ball.

9. The Kimchi stuffing putting device of claim 1, further comprising:

a dumping lifter serving as a device configured to supply the seasoning into the Kimchi stuffing seasoning storage tank by moving up and dumping a movable tank in Kimchi stuffing seasoning is received, wherein the dumping lifter rotates the movable tank to dump the seasoning into the Kimchi stuffing seasoning storage tank, after moving up the movable tank to a specific height.

10. The Kimchi stuffing putting device of claim 9, wherein the dumping lifter includes:

a docking member provided to be coupled to the movable tank; and a tower member coupled to the docking member and provided to move up or move down the docking member, wherein the tower member includes:

a base having a contact surface with a floor;

a driver configured to provide driving force to move up the docking member;

a vertical extension part extending upward from the base to receive a power transmitting member that transmits the driving force of the driver to the docking member; and a guide rail extending by a specific length in a top-bottom direction and extending in a first direction from an upper end extending in the top-bottom direction, wherein the docking member includes:

a docking part coupled to the movable tank;

a driving arm coupled to the power transmitting member; and a guide arm provided to be movable along the guide rail, and positioned above the driving arm, and wherein the guide arm moves along the guide rail in the first direction after the docking member is moved up to a specific height, and the docking member and the movable tank are rotated as the driving arm is continuously moved up.

11. The Kimchi stuffing putting device of claim 9, further comprising:
a seasoning tank sensor configured to sense an amount of seasoning received in the Kimchi stuffing seasoning storage tank,
wherein the dumping lifter moves up and dumps the movable tank, when the amount of seasoning received in the Kimchi stuffing seasoning storage tank is determined as being less than a specific amount.

12. The Kimchi stuffing putting device of claim 1, wherein the spraying mechanism is provided to change at least one of an amount of sprayed seasoning and a period of spraying the seasoning.

13. The Kimchi stuffing putting device of claim 1,
wherein the spraying mechanism is provided to periodically spray a preset specific amount of seasoning, to be turned on or turned off through a user operation, and to adjust a period of spraying the seasoning and an amount of sprayed seasoning.

14. A Kimchi stuffing device comprising:
a Kimchi stuffing seasoning storage tank;
a seasoning transferring pump configured to receive seasoning from the Kimchi stuffing seasoning storage tank and to supply the seasoning to a transferring pipe;
a hopper configured to receive the seasoning from the transferring pipe through a branching pipe branching from the transferring pipe and to temporarily store the seasoning;
a spraying mechanism mounted at an end portion of the hopper to selectively spray the seasoning; and
an ejecting pipe branching from the transferring pipe upstream of the branching pipe, when viewed based on a moving direction of the seasoning in the transferring pipe;
an ejecting valve provided to open or close the ejecting pipe; and
an ejector provided to force a fluid to flow from the transferring pipe to the ejecting pipe;
wherein the spraying mechanism is turned on or turned off, and
wherein the spraying mechanism is provided to periodically spray a specific amount of seasoning when the spraying mechanism is turned on.

15. The Kimchi stuffing putting device of claim 14, further comprising:
a seasoning sensor mounted at a point, from which the ejecting pipe branches, of the transferring pipe, or upstream of the point from which the ejecting pipe branches, when viewed based on the moving direction of the seasoning in the transferring pipe to sense the seasoning,
wherein the ejecting value is operated to close the ejecting pipe and the ejector is provided to be stopped, when the seasoning is sensed by the seasoning sensor.

16. The Kimchi stuffing putting device of claim 14, wherein the seasoning transferring pump is driven at a first RPM while the ejector is operated, and
wherein the seasoning transferring pump is driven at a second RPM higher than the first RPM in the state that the ejector is stopped.

17. A Kimchi stuffing putting device comprising:
a Kimchi discharging conveyor provided to continuously transfer Kimchi in which seasoning is sprayed;
first and second cabbage introducing conveyors provided at left and right sides of the Kimchi discharging conveyor to continuously transfer a cabbage,
a Kimchi stuffing seasoning storage tank;
a seasoning transferring pump to receive seasoning from the Kimchi stuffing seasoning storage tank and to supply the seasoning to a transferring pipe;
a plurality of branching pipe valves mounted on a plurality of branching pipes to adjust introduction of the seasoning into the plurality of hoppers; and
a controller, wherein the controller is configured to: control the branching pipe valves and the seasoning transferring pump such that the seasoning is supplied away from a hopper nearest to the seasoning transferring pump, the seasoning transferring pump is driven in a state that one or two branching pipe valves are open, and remaining branching pipe values are closed, and the seasoning is supplied to every one or two hoppers;
wherein, the Kimchi stuffing putting device further includes:
a plurality of first Kimchi stuffing putting units disposed on the first cabbage introducing conveyor and a plurality of second Kimchi stuffing putting units disposed on the second cabbage introducing conveyor, when a hopper to receive the seasoning from a transferring pipe and to temporarily store the seasoning, a spraying mechanism mounted at an end portion of the hopper to selectively spray the seasoning, and a Kimchi stuffing putting working table to place the cabbage are referred to as a Kimchi stuffing putting unit, and
wherein the first and second Kimchi stuffing putting units are disposed such that the second Kimchi stuffing putting unit is interposed between the first Kimchi stuffing putting units adjacent to each other without overlapping or at least such that a non-overlap area of the first Kimchi stuffing putting unit and the second Kimchi stuffing putting unit is wider than an overlap area of the first Kimchi stuffing putting unit and the second Kimchi stuffing putting unit, in a left-right direction that the first and second cabbage introducing conveyors are arranged.

* * * * *